(12) United States Patent
Kitagawa

(10) Patent No.: US 7,664,366 B2
(45) Date of Patent: Feb. 16, 2010

(54) INFORMATION RECORDING APPARATUS

(75) Inventor: Hitoshi Kitagawa, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 815 days.

(21) Appl. No.: 10/995,240

(22) Filed: Nov. 24, 2004

(65) Prior Publication Data

US 2005/0141854 A1    Jun. 30, 2005

(30) Foreign Application Priority Data

Nov. 27, 2003   (JP)   ............................ P2003-397427

(51) Int. Cl.
*H04N 5/91*   (2006.01)
*H04N 7/00*   (2006.01)
(52) U.S. Cl. ............................ 386/46; 386/111; 386/96
(58) Field of Classification Search .................... 386/46, 386/111, 95
See application file for complete search history.

(56) References Cited

U.S. PATENT DOCUMENTS 6,108,423 A * 8/2000 Sako et al. .................. 380/203
7,103,263 B1 * 9/2006 Murayama et al. ............ 386/83
2002/0129365 A1 * 9/2002 Kim et al. ...................... 725/39
2003/0118320 A1 * 6/2003 Ando et al. .................... 386/52

FOREIGN PATENT DOCUMENTS

| JP | 9-98381 | | 4/1997 |
|---|---|---|---|
| JP | 10-93914 | | 4/1998 |
| JP | 2002044540 | * | 2/2002 |
| JP | 2002-77761 | | 3/2002 |
| JP | 2002-84511 | | 3/2002 |
| WO | WO 01/20826 A1 | | 3/2001 |

* cited by examiner

*Primary Examiner*—Thai Tran
*Assistant Examiner*—Girumsew Wendmagegn
(74) *Attorney, Agent, or Firm*—Morgan, Lewis & Bockius LLP

(57) ABSTRACT

A television set include a DVD-IC 20 for outputting a composite signal a containing subtitle information and closed caption information, a TV-IC 10 for outputting an OSD signal b based on the closed caption information identified in the composite signal a, and a serial bus connecting the DVD-IC 20 and the TV-IC 10. The DVD-IC 20 informs the TV-IC 10 of the setting status of subtitle display based on the subtitle information in a DVD player. The TV-IC 10, if the setting of subtitle display based on the subtitle information in the DVD player is ON, turns OFF the setting of subtitle display based on the closed caption information in the television receiver, thereby prohibiting an OSD signal b from being outputted.

4 Claims, 3 Drawing Sheets

INFORMATION RECORDING APPARATUS

BACKGROUND OF THE INVENTION

1. Field of the Invention

The present invention relates to an information recording device including a signal processing unit for converting received digital broadcasting signals into analog video and audio signals and a recording unit for recording the digital signals converted again from the converted analog video and audio signals on a recording medium.

2. Description of the Related Art

Nowadays, BS digital broadcasting and CS digital broadcasting have been started and terrestrial digital broadcasting is soon commercially practical. The advantage of the digital broadcasting resides in achievability of data broadcasting as well as fineness or clearness of an image or picture and speech or sound. The data broadcasting provides beneficial matters for viewers such as EPG (Electronic Program Guide), teletext broadcasting, program contents, etc.

However, a present information recording device (recording appliance) is designed to disable the digital broadcasting from being recorded, as it is, except D-VHS (Data-VHS), taking copyright into consideration.

Specifically, the DVD apparatus (DVD recorder) which is an existing information recording device includes a signal processing unit for converting received digital broadcasting signals into an analog video and audio signals and a recording unit for recording the digital signals again converted from the converted analog video and audio signals on a recording medium.

Incidentally, techniques for prohibiting copying, taking copyright into consideration are disclosed in, e.g., JP-A-10-093914 and JP-A-2002-077761.

SUMMARY OF THE INVENTION

As described above, in the existing information recording device, the digital broadcasting signals are specially recorded on the recording medium. However, since the digital video and audio signals are once converted into analog signals, at the time of conversion, the digital data information simultaneously transmitted is discarded, and hence not recorded on the recording medium. The contents of data broadcasting can be referred to only while the pertinent program is being received.

Specifically, while the program such as a drama recorded on the recording medium is being reproduced, the data information transmitted relatively to the pertinent program can be not referred to because it has been not recorded on the recording medium. Thus, the existing information recording device has a problem that it does not sufficiently use the merits of the digital broadcasting. In many cases, the data broadcasting part, which does not basically interfere with the copyright, is beneficial if it can be referred to during reproduction.

The present invention has been accomplished in order to solve the above problem. One of objects of the present invention is to provide an information recording device which can use data part with no problem of copyright during recording the information recorded on the recording medium.

According to a first aspect of the invention, there is provided an information recording apparatus including: a tuner that receives a digital broadcasting signal in which a data signal, video signal, and an audio signal are multiplexed; a signal extracting unit that extracts the data signal, video signal, and an audio signal from the digital broadcasting signal; a signal processing unit that converts the video signal and the audio signal extracted by the signal extracting unit into a conventional video format; a selecting unit that selects desired information from among the information included in the data signal extracted by the signal extracting unit; a recording unit that compresses the video signal and the audio signal into compressed data with MPEG format and records the compressed data together with the information selected by the selecting unit.

According to a second aspect of the invention, there is provided an information recording apparatus including: a tuner that receives a digital broadcasting signal in which a data signal, video signal, and an audio signal are multiplexed; a signal extracting unit that extracts the data signal, video signal, and an audio signal from the digital broadcasting signal; and a recording unit that compresses the video signal and the audio signal into compressed data with a predetermined compression format and records the compressed data together with the data signal onto a recording medium.

According to a third aspect of the invention, there is provided an information recording apparatus including: a signal processing unit for converting received digital broadcasting signals into analog video and audio signals and converting the analog video and audio signals thus converted into digital video and audio signals again; and a recording unit for recording said video and audio signals converted into the digital signals in a manner compressed in a MPEG format on a recording medium, wherein said signal processing unit supplies, to said recording unit, a digital data signal related to electric program guide information, text or letter information by teletext broadcasting, information indicative of program contents, etc. separated from the received digital broadcasting signals, and said recording unit records the inputted digital data signal as well as said video and audio signals converted into the digital signals in the manner compressed in the MPEG format on said recording medium, wherein the information recording apparatus further includes a selecting unit for selecting desired information from among the information of the digital data signal separated by the signal processing unit, wherein if only any optional information is selected from the information of the digital data signal by said selecting unit, said recording unit records only the digital data signal of the selected information as well as the video and audio signals in the manner compressed in the MPEG format on the recording medium.

According to a fourth aspect of the invention, there is provided an information recording apparatus including: a signal processing unit for once converting received digital broadcasting signals into analog video and audio signals and converting the analog video signal and audio signals thus converted into digital video and audio signals again; and a recording unit for recording said video and audio signals converted into the digital signals in a manner compressed in a predetermined format on a recording medium, wherein said signal processing unit supplies, to said recording unit, a digital data signal separated from received digital broadcasting signals, and said recording unit records the inputted digital data signal as well as said video and audio signals converted into the digital signals in the manner compressed in the predetermined format on said recording medium.

BRIEF DESCRIPTION OF THE DRAWINGS

The above objects and advantages of the present invention will become more apparent by describing preferred exemplary embodiments thereof in detail with reference to the accompanying drawings, wherein.

DETAILED DESCRIPTION OF THE PREFERRED EMBODIMENTS

Referring now to the accompanying drawings, a description will be given in detail of preferred embodiments of the invention.

Figure 1:
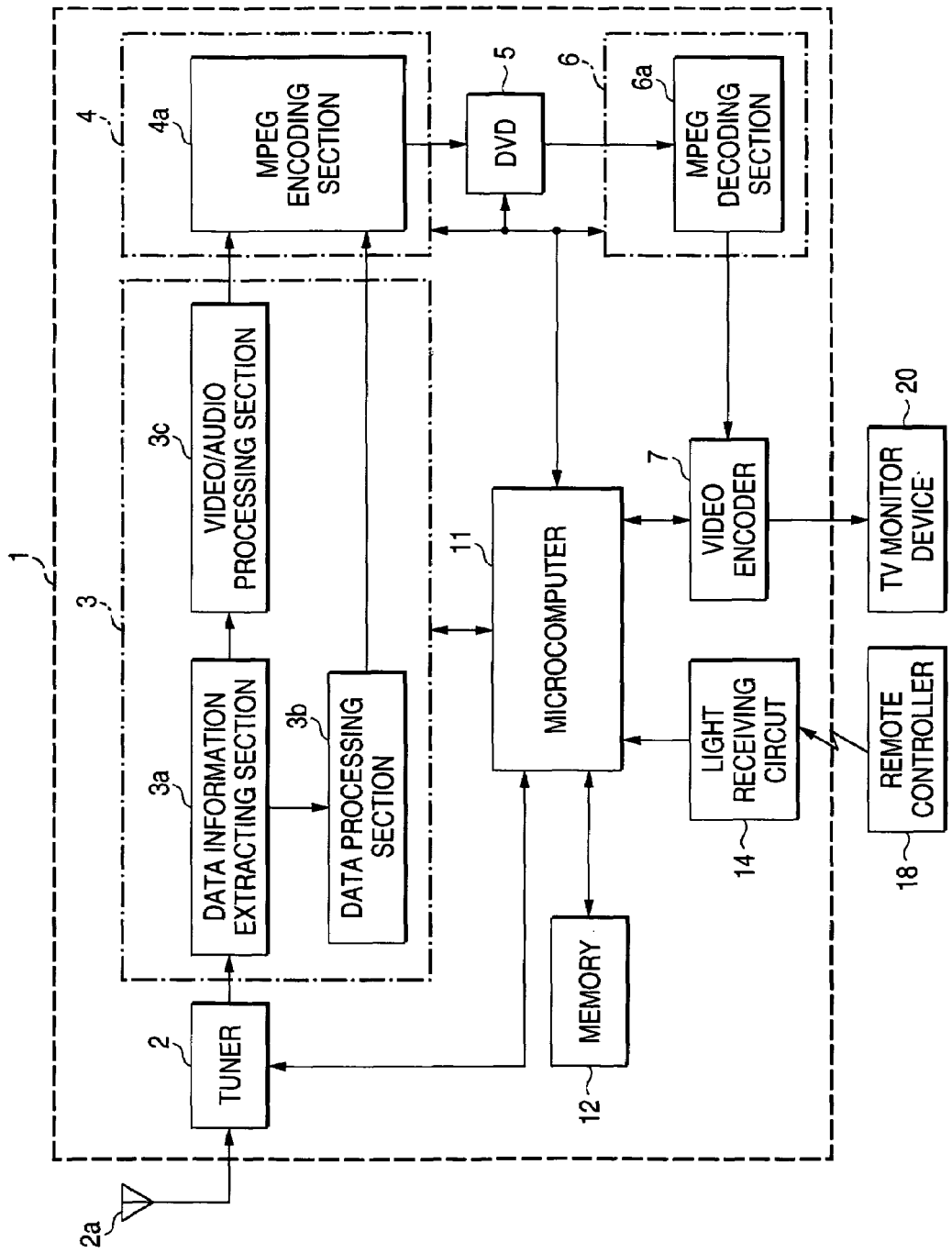
FIG. 1 is a block diagram of a DVD apparatus which is a first embodiment of the information recording device according to the present invention.

FIG. 1 is a schematic block diagram of a DVD apparatus which is an example of the information recording device according to a first embodiment of the present invention.

A DVD apparatus according to the embodiment is an information recording/reproducing device which records the digital signals related to image and sound on a DVD 5, reproduces the recorded digital signals and outputs them to a TV monitor device 20 externally connected to device.

The DVD apparatus 1 includes a tuner 2 for receiving digital broadcasting signals through an antenna 2a; a signal processing circuit 3 for subjecting various kinds of signal processing relative to the invention (described later) to the digital signals received by the tuner 2; a recording circuit 4 having an MPEG encoding section 4a for encoding video and audio digital signals outputted from the signal processing circuit 3 and a digital signal of data information, in a correlated manner in a MPEG format; a DVD (Digital Versatile Disc) 5 for recording the video/audio signals compressed by the MPEG encoding section 4a of the recording circuit 4 and the data signal correlated therewith; a reproducing circuit 6 having an MPEG decoding section 6a for reading and extending the video/audio signals as well as the data signal recorded on the DVD 5 to decode them into the original digital signals; and a video decoder 7 for converting the digital video/audio signals decoded into analog video/audio signals and converting the digital data signal into an analog signal, which are outputted onto a TV monitor device 20.

The DVD apparatus 1 includes a microcomputer 11 for executing the control for the respective parts of the device, a non-volatile memory 12 for storing an operation program for the microcomputer 11, and a light receiving circuit 14 for receiving infrared ray signals corresponding to various commands transmitted from a remote controller 18 and converting them into electric signals to be transferred to the microcomputer 11.

The signal processing circuit 3 includes a data information extracting section 3a, a data processing section 3b and a video/audio processing section 3c.

The data information extracting section 3a separates or discriminately extracts a digital data signal (hereinafter referred to as data information) from the digital broadcasting signals received through the tuner 2 and supplies the data information thus extracted to the data processing section 3b. The data processing section 3b processes the received digital data information as the occasion demands and supplies the data information thus processed to the recording circuit 4. The video/audio processing section 3c once converts the video/audio signals of the digital broadcasting signals received through the data information extracting section 3a into analog video and audio signals, converts the converted analog video and audio signals into the corresponding digital signals again and supplies these digital signals to the recording circuit 4.

Incidentally, the data information recorded on the DVD 5 is recorded on an area separate from the area where the video/audio signals (hereinafter referred to as video/audio information) are recorded. The data information is ready for being extracted from the DVD 5 separately from the audio/video information as the occasion demands. Thus, even while the video/audio information is being reproduced, if necessary, the viewer can reproduce the related data information from the DVD 5 and display the reproduced data information on the TV monitor device 20

The digital data information discriminately extracted by the data information extracting section 3a contains the EPG (electronic program guide) transmitted at regular time intervals, text or letter information displayed on the TV monitor device 20 in the case of teletext broadcasting, information indicative of program contents, etc. The program information contains the title of a program, broadcasting data and time, performers, plot of a story, etc.

In the way, in the DVD apparatus according to the embodiment, the data information except the image and speech which have been conventionally discarded during recording is also recorded on the DVD 5. Thus, while the information (program) recorded on the DVD 5 is reproduced, the data information inclusive of the title of the program, performers, contents (plot) can be also reproduced and referred to. The is very convenient for a viewer.

All of these items of data information having been transmitted may be recorded on the DVD 5 as they are, or otherwise only the item of data information selected through the selecting operation by the viewer may be recorded on the DVD 5.

An explanation will be given of an embodiment of the operation of selecting the information the viewer want to record from the data information having been transmitted.

In the embodiment, the selecting operation will be carried out using the remote controller 18.

Figure 2:
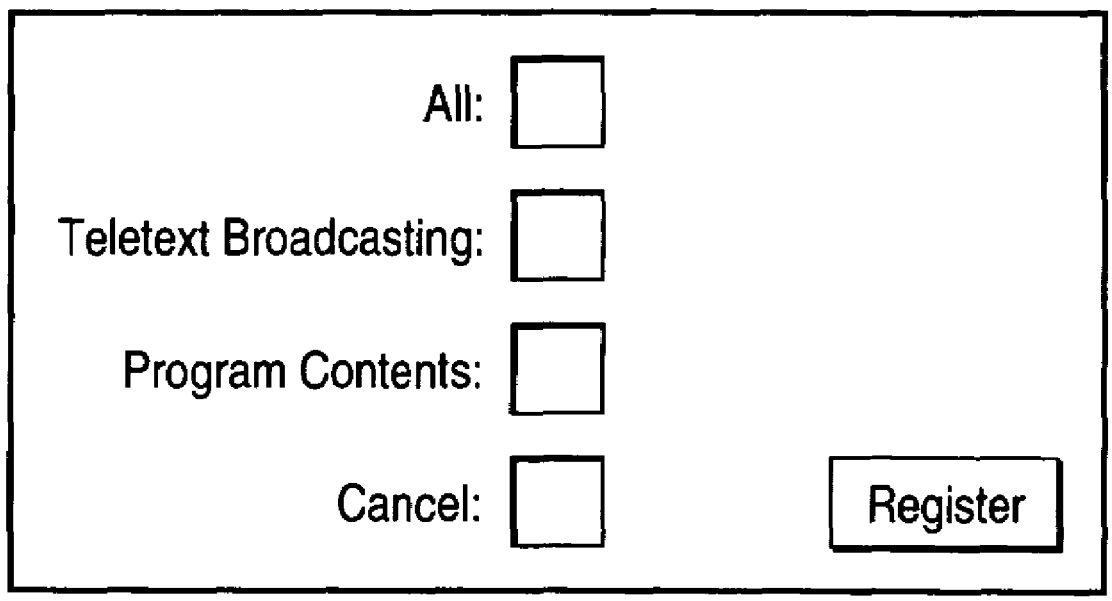
FIG. 2 is a view showing an exemplary setting screen for explaining an operation of selecting the information a viewer want to record from among items of information having been transmitted.

Specifically, when a selecting button (not shown) of the remote controller 18 is pressed, a setting screen as shown in FIG. 2 is displayed on the screen of the TV monitor device 20.

In the example, four items of "all", "teletext broadcasting", "program contents" and "cancel" are displayed. The viewer checks the item(s) he want to record from among these four items and presses a "register" button on the lower portion of the screen. Thus, the kind(s) of the data information the viewer want to record (i.e. information of the item(s) checked by the viewer) is registered in e.g. a memory 12. When the viewer records the program and others, the microcomputer 11 discriminates the kind of the registered data information to control the signal processing circuit 3 so that only the data information consistent with the registered kind of information is recorded on the DVD 5 and that not consistent therewith discarded like before. For example, if only the item of "program contents" is checked, only the information of the program contents in various kinds of information having been transmitted will be recorded on the DVD 5.

Incidentally, in the embodiment, although only four items are displayed as items to be selected, these items are exemplary so that the items to be selected should not be limited to these items. The number of items to be selected can be increased as long as the kind of the transmitted data information can be discriminated.

In the above described embodiment, the information of the digital data signal contains the information such as EPG (electric program guide) information, text or letter information by teletext broadcasting and information indicative of program contents. The program information contains the title of a program, broadcasting data and time, performers, plot of a story, etc.

According to the embodiment, when the digital information recorded on the recording medium is reproduced, the data containing the title of the program, performers, plot of a story, etc. can be taken out from the same recording medium. For this reason, the user can refer to the information relative to the contents and others of the program he is watching at present. Further, in the case where the information recorded on the recording medium is a program by teletext broadcasting, since the information of the teletext broadcasting has been recorded on the same recording medium, even when the deaf watches the program reproduced from the recording medium, the text or letter information linked with the program can be displayed on a monitoring screen.

Figure 3:
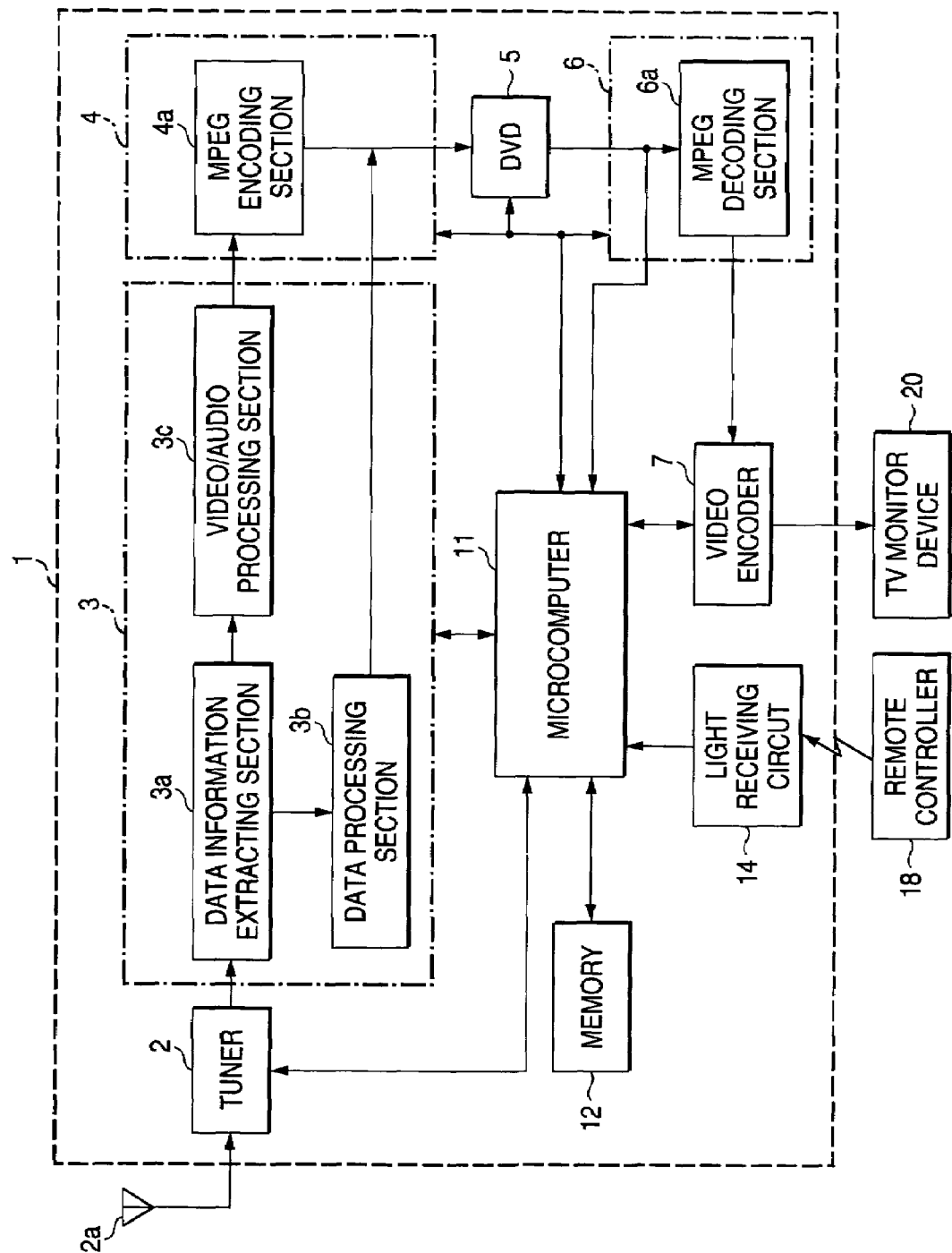
FIG. 3 is a block diagram of a DVD apparatus according to a second embodiment.

FIG. 3 shows a DVD apparatus 100 according to a second embodiment. In FIG. 3, parts the same as those in the first embodiment are denoted by the same reference numerals as those in the first embodiment, so that detailed description of the parts will be omitted here.

In the second embodiment, as shown in FIG. 3, the digital data signal processed by the data processing section 3b is recorded onto the DVD 5 without being encoded in MPEG format by the MPEG encoding section 4a.

Although the present invention has been shown and described with reference to a specific preferred embodiment, various changes and modifications will be apparent to those skilled in the art from the teachings herein. Such changes and modifications as are obvious are deemed to come within the spirit, scope and contemplation of the invention as defined in the appended claims.

What is claimed is:

1. An information recording apparatus comprising:
   a tuner that receives a digital broadcasting signal in which a digital data signal, a first digital video signal, and a first digital audio signal are multiplexed;
   a signal processing unit that processes the first digital video signal and the first digital audio signal into an analog video signal and an analog audio signals and converts the analog video signal and the analog audio signals into a second digital video signal and a second digital audio signal;
   a selecting unit that selects a part of information from among the information included in the digital data signal, and
   a recording unit that compresses the second digital video signal and the second digital audio signal in a compression format, relates the selected information to the compressed second digital video and audio signals, and records the compressed second digital video and audio signals and the selected information which are related to each other onto a recording.

2. The information recording device according to claim 1, wherein the information included in the digital data signal includes at least one of electric program guide information, text information for teletext broadcasting, and program contents information.

3. An information recording apparatus comprising:
   a tuner that receives a digital broadcasting signal in which a data signal, a video signal, and an audio signal are multiplexed;
   a signal extracting unit that extracts the data signal, the video signal, and the audio signal from the digital broadcasting signal;
   a selecting unit that selects a part of information from among information included in the extracted data signal; and
   a recording unit that compresses the extracted video signal and the extracted audio signal into compressed data with a compression format, relates the selected information to the compressed data, and records the compressed data and the selected information which are related to each other onto a recording medium,
   wherein the selecting unit selects the part of the information, which does not infringe a copyright of contents of the digital broadcasting signal from among the information included in the extracted data signal.

4. The information recording device according to claim 1, wherein the selecting unit selects the part of the information, which does not infringe a copyright of contents of the digital broadcasting signal from among the information included in the digital data signal.

* * * * *